United States Patent
Zhou et al.

(10) Patent No.: US 6,235,196 B1
(45) Date of Patent: May 22, 2001

(54) BIOLOGICAL WASTEWATER TREATMENT SYSTEM

(75) Inventors: Shaojun James Zhou, Palatine, IL (US); Laura Supra, Redondo Beach, CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/170,880

(22) Filed: Oct. 13, 1998

Related U.S. Application Data
(60) Provisional application No. 60/082,778, filed on Apr. 23, 1998.

(51) Int. Cl.$^7$ ................................. C02F 3/30; C02F 3/02
(52) U.S. Cl. ..................... 210/605; 210/610; 210/622; 210/624
(58) Field of Search .................... 210/605, 621, 210/622, 623, 624, 625, 610

(56) References Cited

U.S. PATENT DOCUMENTS

| | | | |
|---|---|---|---|
| Re. 32,429 | * 6/1987 | Spector | 210/605 |
| 3,821,087 | 6/1974 | Knazek . | |
| 3,997,396 | 12/1976 | Delente . | |
| 4,087,327 | 5/1978 | Feder . | |
| 4,184,922 | 1/1980 | Knazek . | |
| 4,266,026 | 5/1981 | Breslau . | |
| 4,391,912 | 7/1983 | Yoshida . | |
| 4,440,853 | 4/1984 | Michaels . | |
| 4,488,967 | * 12/1984 | Block | 210/605 |
| 4,522,722 | * 6/1985 | Nicholas | 210/605 |
| 4,654,308 | 3/1987 | Safi . | |
| 4,743,545 | 5/1988 | Torobin . | |
| 4,804,628 | 2/1989 | Cracauer . | |
| 4,889,812 | 12/1989 | Guinn . | |
| 4,983,299 | 1/1991 | Lupton . | |

(List continued on next page.)

OTHER PUBLICATIONS

Hirasa et al, "Oxygen Transfer From Silicone Hollow Fiber Membrane To Water," Journal of Fermentation and Bioengineering, vol. 71, No. 3, 206–207 (1991).

Rittmann, "Comparative Performance of Biofilm Reactor Types," Biotechnology and Bioengineering, vol. XIV, pp. 1341–1370 (1982).

Rothemund et al, "Biofilms Growing On Gas Permeable Membranes," Wat. Sci. Tech., vol. 29, No. 10–11, pp. 447–454 (1994).

Schussel et al, "A Urease Bioreactor For Water Reclamation Aboard Manned Space Craft," Chemosphere, vol. 30, No. 5, pp. 985–994 (1995).

(List continued on next page.)

Primary Examiner—Chester T. Barry
(74) Attorney, Agent, or Firm—William J. Zak, Jr., Esq.

(57) ABSTRACT

A bioprocessing system for a feed such as wastewater comprises an anaerobic reactor subsystem, an aerobic reactor subsystem, and a recycle loop for partial recycling of the aerobic reactor subsystem effluent. The anaerobic reactor subsystem is capable of providing anaerobic processing of the wastewater in the substantial absence of aerobic processing of the wastewater. The anaerobic reactor subsystem can include a single anaerobic reactor or a plurality of reactors. The aerobic reactor subsystem is in direct communication with the anaerobic reactor subsystem, with the aerobic reactor subsystem being capable of providing aerobic processing of the wastewater in the substantial absence of anaerobic processing of the wastewater. The aerobic reactor subsystem processes the wastewater from the anaerobic reactor subsystem without intervening bioprocessing of the wastewater. As with the anaerobic subsystem, the aerobic reactor subsystem can include a single aerobic bioreactor or a plurality of reactors. The recycle loop partially recycles an effluent from the aerobic reactor subsystem to an influent of the anaerobic reactor subsystem. The recycle loop provides a means for pH regulation, dilution of the feed, and nitrite-nitrate removal.

21 Claims, 1 Drawing Sheet

U.S. PATENT DOCUMENTS

| | | |
|---|---|---|
| 5,002,890 | 3/1991 | Morrison . |
| 5,057,428 | 10/1991 | Mizutani . |
| 5,064,764 | 11/1991 | Besnainon . |
| 5,126,238 | 6/1992 | Gebhard . |
| 5,217,616 | 6/1993 | Sanyal . |
| 5,240,600 | 8/1993 | Wang . |
| 5,380,438 * | 1/1995 | Nungasser ............................ 210/605 |
| 5,389,248 | 2/1995 | Pare . |
| 5,413,714 | 5/1995 | DeFilippi . |
| 5,500,112 | 3/1996 | McDonald . |
| 5,503,738 | 4/1996 | DeFilippi . |
| 5,531,896 * | 7/1996 | Tambo et al. ........................ 210/605 |
| 5,543,052 | 8/1996 | Lupton . |
| 5,563,068 | 10/1996 | Zhang . |
| 5,578,214 | 11/1996 | Yamasaki . |
| 5,580,770 | 12/1996 | DeFilippi . |
| 5,582,732 | 12/1996 | Mao . |
| 5,585,004 | 12/1996 | Livingston . |
| 5,585,266 | 12/1996 | Plitt . |
| 5,656,421 | 8/1997 | Gebhard . |
| 5,702,604 | 12/1997 | Yamasaki . |
| 5,702,941 | 12/1997 | Schwarz . |
| 5,849,192 * | 12/1998 | Jagush ................................. 210/610 |

OTHER PUBLICATIONS

Stephenson et al, "Membrane Bioreactors For Wastewater Treatment," ICHEME–Environmental Biotechnology, pp. 10–12.

Winnen et al, "Effectiveness Of The Membrane Bioreactor In The Biodegradation Of High Molecular Compounds," Environmental Engineering, pp. 133–140.

Supra et al., "Advancements in Regenerative Life Support Waste Water Bioprocessing Technology," SAE Technical Paper Series, 26th International Conference on Environmental Systems (1996).

* cited by examiner

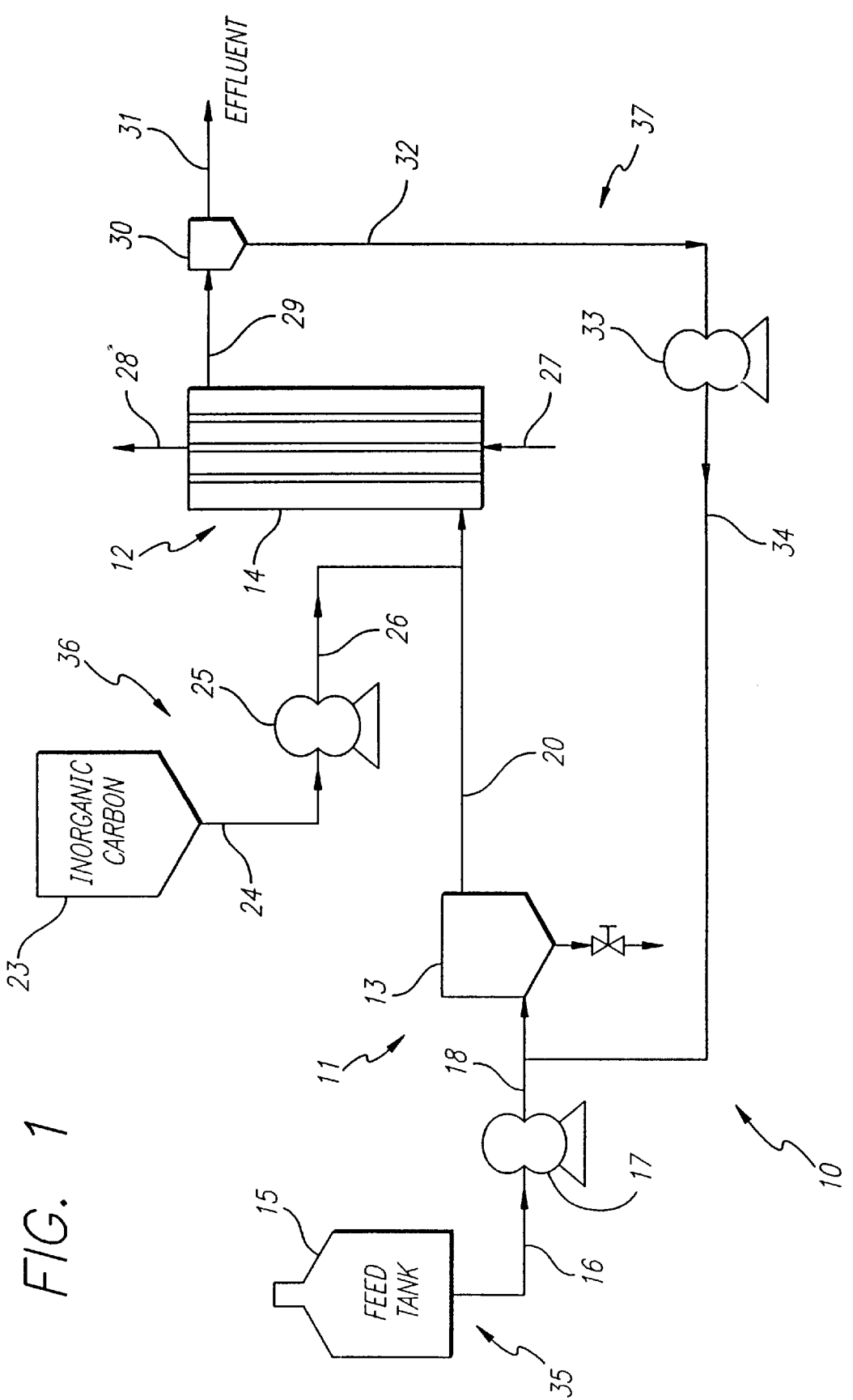

BIOLOGICAL WASTEWATER TREATMENT SYSTEM

CROSS-REFERENCE TO RELATED APPLICATIONS

The present application claims the benefit of U.S. Provisional Application No. 60/082,778, filed Apr. 23, 1998.

BACKGROUND OF THE INVENTION

The present invention generally relates to apparatus and methods for the bioprocessing of wastewater and, more specifically, to an improved bioprocessing system and method of processing wastewater that can be used in a micro-gravity environment.

A bioprocessor or bioreactor can be broadly defined as a container with a bio-substance therein. As a chemically active biological substance, it can be one of many nonliving substances and living microorganisms. For example, the bio-substance may be a chemical such as an enzyme or hormone or a living entity such as a bacterial or viral species. The container of the bioreactor has taken various forms, including items as simple as a vat to more complex items like porous elements and microcapsules.

Bioprocessors have frequently been used to grow useful cells or to clean contaminated effluent, such as water. For the treatment of contaminated water, the bioprocessor has been an alternative to the use of physical methods and chemical methods. The physical methods have included carbon adsorption onto activated charcoal units, air stripping and membrane separation. Some of the chemical methods have included precipitation and oxidation/reduction.

Biological methods can include aerobic or anaerobic processes. Aerobic processes have been more commonly employed due to their effectiveness in converting contaminants into less harmful substances. More specifically, biofilms have been widely used because an active biomass produced in the reactor allows large volumetric loadings and good effluent quality without the need for solids separation. The biofilm bioreactors have been generally categorized as continuously stirred tank reactors (CSTRs), fixed-bed and fluidized bed.

In the CSTR, the liquid (i.e., waste water) is completely mixed, such as by mechanical stirring, while an activated biomass grows and uniformly contacts the liquid without attachment to a media. In the fixed-bed reactor, the biofilm attaches to an immobile solid media while the liquid passes through the reactor. In the fluidized bed reactor, the liquid flows through the reactor at a sufficiently high rate to fluidize the solid media. Thereby, the solid media and attached biofilm are mixed throughout the reactor.

In both the fixed-bed and fluidized-bed bioreactors, the effluent can be recycled. A primary effect of recycling is to dilute the feed. Furthermore, evenly distributing the feed or nutrient throughout the bioreactor promotes more uniform growth of the biofilm throughout the reactor.

In fixed-bed bioreactors, the bioreactors can be classified as hollow fiber membrane or packed bed. In the former, a tubular or a hollow fiber membrane is used as the carrier or medium on which the biofilm can grow. In the latter, ceramic porous bodies in multi-layered plates, or hydrophobic polyurethane foams and pall rings (as in U.S. Pat. No. 5,217, 616), have been used as the medium. In the hollow fiber membrane bioreactor, oxygen or air is transported through the lumens of the hollow fibers by a pressure gradient applied to the membrane interfaces. The biofilm is typically grown in the fluid space between the outer shells of the hollow fiber membrane and the shell wall of the bioreactor.

The oxygen required for biofilm growth can be supplied by several commonly used methods such as aeration through bubble diffusers and permeation through membranes. Oxygen permeates or transports through a non-porous polymer membrane when a pressure gradient is applied between the two interfaces of the membrane. The permeation process occurs by a solution-diffusion mechanism that is commonly controlled by the molecular diffusion of oxygen in the polymer matrix of the membrane. At the same time, solution equilibrium is established between the oxygen molecules in a gas phase in contact with the membrane interfaces and the molecules dissolved in the polymer at those interfaces. If one of the membrane interfaces is in contact with a liquid phase, then oxygen transfer from the gas phase to the liquid phase through the membrane also occurs by the solution-diffusion mechanism. A bubbleless oxygen transfer to the liquid phase can then be achieved by controlling the gas phase oxygen pressure. In a micro-gravity environment, oxygenation of the liquid phase through a conventional bubble diffuser method is no longer possible due to the difficulties associated with phase separation. Utilization of a membrane to oxygenate a liquid in a micro-gravity environment eliminates the two-phase fluid flow problem.

Irrespective of the type of bioreactor, a single bioreactor is of course limited in utility by its size. Thus, attempts have been made to combine multiple bioreactors to scale up the overall system utility. An early example of using multiple bioreactors is shown in U.S. Pat. No. 3,821,087. Therein, a bioreactor is of the hollow fiber type through which a liquid nutrient medium can flow. A plurality of bioreactors can be utilized in a parallel or serial arrangement. A similar parallel or serial arrangement is described in U.S. Pat. No. 4,266, 026. However, the serial or parallel arrangements in those patents tend to increase the size of the overall system and do not provide for both aerobic and anaerobic processing.

A wastewater treatment system in U.S. Pat. No. 4,279,753 includes three aerobic-anaerobic bioreactors operating in series. In each aerobic-anaerobic bioreactor, wastewater first flows through an aerobic portion and then downwards to anaerobic portion wherein the flow is received for upward movement. The series of bioreactors is intended to provide incremental consumption of organic nutrients, nitrification and denitrification. However, the need for a plurality of the same type of bioreactors arranged in series increases the overall size of the system. And the need for upward and downward flows of the wastewater makes it unsuitable for a micro-gravity environment.

Another wastewater treatment system is shown in U.S. Pat. No. 5,578,214. A first bioreactor includes an anaerobic lower portion where the feed is introduced. From the anaerobic lower portion, the feed moves up and into an aerobic-anaerobic upper portion. A second bioreactor again provides aerobic processing. But since there is no apparent recycling of the feed, system efficiency is compromised, no self controlling of pH is employed, and in the anaerobic zone generation of gaseous products such as methane and hydrogen sulfide will occur.

U.S. Pat. No. 5,702,604 discloses three bioreactors operating in series with one another. The first bioreactor includes an anaerobic portion for initial treatment and an aerobic portion for subsequent treatment. The second bioreactor includes an aerobic portion that receives wastewater from the aerobic portion of the first bioreactor. From the second bioreactor, the wastewater can move into a denitrification tank or be recirculated back to the first bioreactor. The third bioreactor receives wastewater from the denitrification tank and includes a hydroponic portion within which plants can be cultivated. Disadvantages, however, include the need for multiple types of bioreactors and tanks that increase the complexity of the system. Also complicating the system is a combined anaerobic-aerobic bioreactor that requires upward and downward flows of the wastewater, a partition to separate aerobic and anaerobic processing, and a filter that separates the anaerobic-aerobic processing from exhaust gas processing.

In another wastewater treatment system utilizing a series of bioreactors, U.S. Pat. No. 5,582,732 provides an anaerobic bioreactor, an anoxic bioreactor, an aerobic bioreactor, and then a nitrification bioreactor in series. In the anaerobic bioreactor, there are apparently no nitrites or nitrates undergoing conversion (i.e., denitrification). Instead, it is in the separate anoxic bioreactor that nitrites and nitrates are converted into nitrogen gas and nitrous oxide. The aerobic bioreactor appears to be essentially involved in total organic carbon (TOC) degradation, but with little or no nitrification. Consequently, the separate nitrification bioreactor is provided wherein nitrites and nitrates are produced and can be routed back to the anoxic bioreactor. Little, if any, TOC degradation apparently occurs in the nitrification bioreactor. Disadvantages to the system include the need for multiple types of bioreactors carrying out separate functions or steps, as opposed to combined functions or steps. Aeration occurs outside the aerobic bioreactor by a venturi bubble system that complicates the aeration process and makes the system micro-gravity incompatible. Also, only about 30% of the system is plug flow while about 70% is operated as a CSTR which, in turn, increases the total system size.

Supra et al., "Advancements in Regenerative Life Support Waste Water Bioprocessing Technology," SAE Technical Paper Series, 26$^{th}$ International Conference on Environmental Systems (1996) disclose a system for processing gray water by the use of an immobilized cell bioreactor that provides a majority of TOC degradation and nitrification. An effluent from the bioreactor is recycled to a roughing filter that is primarily designed to remove particulates and achieves about 30% TOC degradation. However, since the roughing filter only achieves a small amount of TOC degradation, the overall efficiency of the system may be limited.

As another example of recycling, U.S. Pat. No. 4,804,628 utilizes a hollow fiber cartridge containing a plurality of capillaries as a bioreactor, which is similar to U.S. Pat. Nos. 3,821,087 and 4,266,026. Upon a feed being delivered through the bioreactor, the feed is re-circulated back to a delivery system for recycling into the bioreactor. In part, the re-circulation is intended to assist in minimizing the formation of nutrient gradients, minimizing the formation of microenvironments around metabolizing cells, and minimizing pressure drops along the length of the capillaries. Yet, disadvantages to the system include the fact that both aerobic and anaerobic processes are not simultaneously provided. U.S. Pat. No. 5,656,421 also shows the use of parallel operating bioreactors wherein a flow is re-circulated through the bioreactors.

As can be seen, there is a need for improved bioprocessing equipment and methods. In particular, there is a need for apparatus and methods that reduce the overall system size by, for example, combining steps or functions in a single bioreactor or subsystem, while maintaining or increasing system efficiency. A further need is for a system that provides both aerobic and anaerobic processing, while maintaining simplicity in system design. Also needed is a bioprocessor system which improves efficiency by utilizing the system's own by-products to take the place of an oxidizer which otherwise needs to be added to the system. Another need is for improved pH control for system optimization. Yet another need is for a system that is not dependent upon gravity for oxygenation.

SUMMARY OF THE INVENTION

In the present invention, a bioprocessor system for a feed comprises an anaerobic bioreactor subsystem capable of providing anaerobic processing of the feed in the substantial absence of aerobic processing, with the anaerobic processing comprising a step of substantial total organic carbon degradation in the feed and a step of denitrification in the feed; an aerobic bioreactor subsystem in communication with the anaerobic bioreactor subsystem, with the aerobic bioreactor subsystem capable of providing aerobic processing of the feed in the substantial absence of anaerobic processing of the feed, with the aerobic processing comprising a step of insubstantial total organic carbon degradation in the feed and a step of nitrification in the feed; and a recycle loop for partial recycling of effluent from the aerobic bioreactor subsystem to an influent of the anaerobic bioreactor subsystem for pH regulation, dilution of the feed, and nitrite/nitrate removal.

A method of bioprocessing according to the present invention comprises the steps of anaerobically processing a feed in an anaerobic bioreactor subsystem; aerobically processing the partially degraded feed in an aerobic bioreactor subsystem that is in direct feed communication with the anaerobic bioreactor subsystem, with the aerobic bioreactor subsystem being substantially incapable of anaerobic processing of the feed; and recycling at least a portion of the effluent of the aerobic bioreactor subsystem to the influent of the anaerobic bioreactor subsystem, while the remainder of the aerobic bioreactor subsystem effluent is of an acceptable product quality in the substantial absence of further bioprocessing of the feed.

These and other features, aspects and advantages of the present invention will become better understood with reference to the following drawings, description and claims.

BRIEF DESCRIPTION OF THE DRAWINGS

FIG. 1 is a schematic diagram of a bioprocessor system according to an embodiment of the present invention.

DETAILED DESCRIPTION OF THE INVENTION

FIG. 1 schematically depicts a bioprocessor system 10 according to one embodiment of the present invention. The system 10 generally includes a feed source 35 that provides a feed or nutrient medium to an anaerobic bioreactor subsystem 11 for anaerobic processing of the feed. The feed is then pumped into an aerobic bioreactor subsystem 12 while a carbon source 36 optionally provides inorganic carbon into the subsystem 12. The aerobic bioreactor subsystem 12 provides aerobic processing of the feed from the anaerobic bioreactor subsystem 11 without the need of an intervening degradation or bioprocessing of the feed. From the aerobic bioreactor subsystem 12, the feed exits as useable material (i.e., of acceptable quality product) without the need for further bioprocessing. Alternatively, the feed from the aerobic bioreactor subsystem 12 can at least partially recycle through the system 10 by flowing through a recycle loop 37 and returning to the anaerobic bioreactor subsystem 11. In so doing, the pH in the system 10 becomes self-controlling and the provision for an oxidizer becomes self-perpetuating. Additionally, the overall size of the system 10 is minimized.

More specifically, a preferred embodiment of the bioprocessing system 10 is shown in FIG. 1. It can be seen therein that the feed source 35 comprises a feed tank 15 in which a feed or other nutrient medium can be stored. The particular feed utilized can vary and is merely dependent upon what is to be processed in the system 10. For example, the feed can be wastewater or space station gray water that is comprised of water from hand wash, shower, humidity condensate and urine. The feed source 35 further comprises a piping 16 which can flow the feed from the feed tank 15 and into a pump 17. The pump 17 can pump the feed through a piping 18 and thereby become an influent to the anaerobic bioreactor subsystem 11.

The anaerobic bioreactor subsystem 11 anaerobically processes the feed in the substantial absence of aerobic processing. In other words, while anaerobic processing is the primary process in the subsystem 11, aerobic processing can also occur to an incidental extent, since no effort need be made to remove dissolved oxygen in the recycle loop 37 that brings an influent to the subsystem 11, as more fully described below. Furthermore, the anaerobic bioreactor subsystem 11 provides a combination of functions or steps, including total organic carbon (TOC) degradation and denitrification of nitrites/nitrates which is described below.

The anaerobic subsystem 11 comprises an anaerobic bioreactor 13 that can be of various well-known designs. Preferably, however, the reactor 13 is of a modular type and not dependent upon gravity for operation. In particular, for a micro-gravity environment, the reactor 13 is preferably not dependent upon the requirement for upward and downward flow of the feed to be processed. With such design parameters for the anaerobic reactor 13, the system 10 can be utilized in a micro-gravity environment such as outer space. One example of a useful design is a hollow fiber type reactor, such as that described in U.S. Pat. No. 3,821,087.

Irrespective of the particular design of the anaerobic bioreactor 13, the bioprocessing function of the bioreactor 13 is dependent upon the use of facultative microorganisms to anaerobically and anoxically degrade or process contaminants in the feed. The particular microorganisms selected for use is largely dependent upon the particular contaminants to be degraded. For the space station gray water described above, the anaerobic microorganisms can include micrococcus, pseudomonas, denitrobacillus, spirillum, bacillus and achromobacter.

As mentioned above, in the anaerobic reactor subsystem 11, a primary chemical reaction or step that occurs in this embodiment is the denitrification of ions, i.e., conversion of nitrites and nitrates to nitrogen gas with the nitrites and nitrates resulting from the aerobic processes described below. Another primary step or function occurring is the degradation of a substantial amount (i.e., at least a majority) of the total organic carbon (TOC) in the feed, i.e., conversion of carbon compounds to carbon dioxide and water. The substantial total organic carbon degradation is preferably characterized by far more than a majority of the TOC being degraded, and more preferably at upwards of about 90%. And also occurring in the anaerobic subsystem 11 is the growth of the anaerobic microorganisms which results in the accumulation of bio-sludge or biomass.

It is preferred in this embodiment that the contaminants initially undergo anaerobic processing, as opposed to aerobic processing. This is because the former has a higher treatment efficiency for high strength wastewater. Anaerobic processing also produces smaller amounts of bio-sludge, requires fewer nutrients, and has a lower operating cost. Since anaerobic microorganisms typically generate less cell mass per unit organic consumed than do aerobic species, use of anaerobes to perform the bulk or majority of the organic degradation will minimize generation of solid waste. Furthermore, aerobic nitrification is typically inhibited by the high total organic carbon loading that may be present in the untreated feed. Therefore, placing the anaerobic reactor subsystem 11 upstream of the aerobic reactor subsystem 12 will allow a higher degree of nitrification to occur. The preferred arrangement of the anaerobic subsystem 11 vis-à-vis aerobic subsystem 12 also enables the nitrites and nitrates to be recycled from the aerobic subsystem 12 effluent to the anaerobic subsystem 11 influent and which are used as oxidizers for TOC degradation.

Although the anaerobic bioreactor subsystem 11 depicted in FIG. 1 includes only a single anaerobic bioreactor 13, a plurality of bioreactors 13 operating in series or in parallel is also contemplated. In a series of bioreactors 13, there is at least a first anaerobic bioreactor 13 and a last anaerobic bioreactor 13. Thereby, the first reactor 13 receives an influent from the feed source 35 and the last reactor produces an effluent from the anaerobic bioreactor subsystem 11. That effluent continues on to the aerobic bioreactor subsystem 12 and the recycle loop 37. And while each of the plurality of bioreactors 13 is preferably of the same type design, it is nevertheless contemplated that different designs can be incorporated. Irrespective of whether the anaerobic bioreactor subsystem 11 includes a single or multiple reactors 13, the effluent from the subsystem 11 exits through a piping 20 and to the aerobic bioreactor subsystem 12.

The aerobic bioreactor subsystem 12, in contrast to the anaerobic bioreactor subsystem 11, provides a step of aerobic processing in the substantial absence of anaerobic processing. While aerobic processing is the primary process in the subsystem 12, some amount of anaerobic processing can occur since there may be areas within the aerobic bioreactor subsystem 12 that do not receive oxygen. The aerobic bioreactor subsystem 12 comprises an aerobic bioreactor 14 that can be of various well-known designs. But like the anaerobic bioreactor 13, the aerobic bioreactor 14 is preferably of a modular type and is not dependent upon gravity for operation. Thus, one example of a useful design is the hollow fiber type reactor described in U.S. Pat. No. 3,821,087.

With a preferred hollow fiber design for the aerobic bioreactor 14, internal aeration can occur such that oxygen or air can enter the reactor 14 through an inlet 27 and exit through an outlet 28. Thereby, an oxygen source is provided for the oxidation processes occurring within the reactor 14, while the aerobic bioreactor subsystem 12 remains micro-gravity compatible. Additionally, the preferred design maximizes the overall plug flow characteristics of the bioprocessor system 10. With such a plug flow character, as opposed to a CSTR character where bubble diffusers are used for aeration, the present invention is suitable for micro-gravity environments due to the absence of bubble aeration.

Irrespective of the plug flow characteristic or particular design of the aerobic reactor 14, the bioprocessing function of the reactor 14 is dependent upon the use of aerobic microorganisms, such as nitrosomonas, nitrobacter, acinetobacter and aerobacter. During the aerobic processing, the primary chemical reactions or steps that occur in this embodiment include an insubstantial amount (i.e., less than a majority) of TOC degradation. The insubstantial total organic carbon degradation is preferably characterized by far less than a majority of the TOC being degraded, and more preferably as little as about 10%. Another primary step during aerobic processing is nitrification, which is the conversion of ammonium ions to nitrite and then nitrate ions.

As mentioned above, it is preferred in this embodiment that the contaminants undergo aerobic processing directly following anaerobic processing. Thus, there is no intervening step of additional bioprocessing (such as nitrification and denitrification) or degradation of contaminants. Moreover, it is preferred that aerobic processing follow anaerobic processing because nitrification occurs only under aerobic and low TOC conditions and further because some organic compounds can be degraded more efficiently under aerobic conditions.

As with the anaerobic bioreactor subsystem 11, the aerobic bioreactor subsystem 12 can include only one aerobic bioreactor 14 (i.e., a second bioreactor 14) or a plurality of bioreactors 14 operating in series or in parallel. In the context of a plurality of bioreactors 14 in series, and also like the anaerobic bioreactor subsystem 11, there is at least a first aerobic bioreactor 14 and a last aerobic bioreactor 14. The first reactor 14 receives an influent from the anaerobic bioreactor subsystem 11, as well as an optional inorganic carbon source such as a sodium bicarbonate source 36 described below. The last reactor 14 in the series produces an effluent from the aerobic reactor subsystem 12 that can exit through a piping 29. And while each of the reactors 14 is preferably of the same type design, it is nevertheless contemplated that different designs can be incorporated.

The feed passing through the piping 29 then moves into a valve 30 which can allow the feed to exit the processing system 10 as a useable effluent 31, such as irrigation water. Alternatively, the feed can be used as an oxidizer to the anaerobic reactor subsystem 11 by the feed being partially recycled through the recycle loop 37. The loop 37 comprises a piping 32 which can receive the flow from the valve 32 and move the flow through a pump 33. The pump 33, which is part of the recycle loop 37, can then pump the aerobic reactor subsystem 12 effluent through a piping 34 and back to the piping 18. As can be appreciated, a part of the aerobic reactor subsystem 12 effluent then becomes part of the influent to the anaerobic reactor subsystem 11.

As a result of the aerobic reactor subsystem 12 effluent being partially recycled, it can be appreciated by those skilled in the art that the system 10 provides a means for a self-controlled pH level. In other words, the feed moves through the anaerobic reactor subsystem 11 (where pH is generally maintained at about 7.0–10.0 in this embodiment) and then the aerobic reactor subsystem 12 (where pH is generally maintained at about 6.0–8.0). Consequently, the nitrogen containing compounds in the feed are converted from a base to an acid. If the feed in the acid form is recycled back to the anaerobic reactor subsystem 11, the feed in the base form becomes pH adjusted without a separately intervening step of pH control. The omission of an intervening step is the result of recycling nitrite and nitrate ions from the aerobic reactor subsystem 12 and back to the anaerobic reactor subsystem 11 such that the nitrite and nitrate can serve as an oxidizer by facultative microbial species in the anaerobic subsystem 11. Thus, a need for a separate source of oxidizers is eliminated since the aerobic subsystem 12 provides a self-perpetuating source of oxidizers as the system 10 continues to process the feed.

As mentioned above, the processing system 10 can optionally include an inorganic carbon source 36 which, in this embodiment, comprises a tank 23 that provides an inorganic carbon, such as sodium bicarbonate, through a piping 24 and into a dosing pump 25. From the pump 25, the inorganic carbon solution can be pumped through a piping 26 and into the piping 20 in order to become part of the influent to the aerobic reactor subsystem 12. For those skilled in the art, it can be seen that the inorganic carbon source 36 provides an additional source of carbon necessary for nitrifying microorganisms to grow in the aerobic reactor subsystem 12. Thus, other inorganic carbon compounds may be provided, such as potassium bicarbonate in the tank 23 or calcium carbonate or marble chips placed within the aerobic reactor(s) 14.

It can be seen that the present invention provides improved apparatus and methods of bioprocessing various items, such as wastewater. An advantage provided by the present invention is the minimization of space requirements through the elimination of different or the same types of reactors, all of which tend to increase system size. Through the elimination of reactors, different functions are combined into a single reactor. This is of particular importance for an environment such as outer space where a small increase in payload can mean a large increase in cost. Minimizing the number of reactors also achieves efficiency and lower cost since there will be fewer reactors to maintain and/or replace over time. The present invention also increases system efficiency by providing a means for self-controlling the pH of the system. In other words, the pH is controlled without a separate means for control, which control in the prior art has been by means such as separately adding an acid or base. Also, the present invention increases system efficiency by utilizing the byproducts produced from the bioprocessing as an oxidizer, thereby eliminating the need for a separate source of oxidizer.

It should be understood, of course, that the foregoing relates to preferred embodiments of the invention and that modifications may be made without departing from the spirit and scope of the invention as set forth in the following claims.

We claim:

1. A bioprocessing system for wastewater, comprising:
   an anaerobic bioreactor subsystem in feed communication with said wastewater, said anaerobic bioreactor subsystem capable of providing fixed film anaerobic processing of said wastewater in the substantial absence of aerobic processing of said wastewater, said anaerobic processing comprising a step of substantial total organic carbon degradation of more than 50% and up to about 90% in said wastewater and a step of substantial denitrification in said wastewater;
   an aerobic bioreactor subsystem downstream of said anaerobic reactor subsystem such that said aerobic bioreactor subsystem can directly receive an effluent from said anaerobic bioreactor subsystem in the substantial absence of additional bioprocessing of total organic carbon in said anaerobic bioreactor subsystem effluent, said additional bioprocessing being less than 50% and down to about 10%, said aerobic bioreactor subsystem capable of providing fixed film aerobic processing of said wastewater in the substantial absence of anaerobic processing of said wastewater, said aerobic processing comprising a step of nitrification in said wastewater; and
   a recycle loop for directly recycling a portion of an effluent from said aerobic bioreactor subsystem to an influent of said anaerobic bioreactor subsystem, said portion of effluent being in an amount sufficient to provide for continuous, self-regulation of pH in said anaerobic bioreactor subsystem.

2. The system of claim 1, further comprising a feed source in communication with said anaerobic bioreactor subsystem.

3. The system of claim 1, wherein said aerobic processing further comprises a step of insubstantial total organic carbon degradation in said wastewater.

4. The system of claim 1, further comprising an inorganic carbon source in communication with an influent of said aerobic bioreactor subsystem.

5. The system of claim 1, wherein said anaerobic bioreactor subsystem consists of a single anaerobic bioreactor and said aerobic bioreactor subsystem consists of a single aerobic bioreactor.

6. The system of claim 1, wherein said anaerobic bioreactor subsystem comprises one of a plurality of serially operable or parallely operable anaerobic bioreactors disposed upstream of said aerobic bioreactor subsystem.

7. The system of claim 1, wherein said aerobic bioreactor subsystem comprises one of a plurality of serially operable or parallely operable aerobic bioreactors disposed downstream of said anaerobic bioreactor subsystem.

8. A bioprocessing system for wastewater that provides aeration in a micro-gravity environment, comprising:
a feed source comprising said wastewater;
an anaerobic bioreactor subsystem in feed communication with said feed source, said anaerobic bioreactor subsystem comprising a first fixed film membrane bioreactor enabling total organic carbon degradation of more than 50% and up to about 90% in said wastewater and substantial denitrification of nitrites and nitrates in said wastewater;
an aerobic bioreactor subsystem in feed communication with said anaerobic bioreactor subsystem, said aerobic bioreactor subsystem comprising a second fixed film membrane bioreactor enabling insubstantial total organic carbon degradation of less than 50% and down to about 10% in said wastewater and substantial nitrification of ammonium ions in said wastewater to said nitrites and nitrates;
an inorganic carbon source in communication with an influent to said aerobic bioreactor subsystem; and
a recycle loop for directly recycling a portion of an effluent from said aerobic bioreactor subsystem to an influent of said anaerobic bioreactor subsystem, said portion of effluent being in an amount that enables continuous, self-regulating pH control.

9. The system of claim 8, wherein said anaerobic bioreactor subsystem further comprises a plurality of said first membrane bioreactors.

10. The system of claim 9, wherein said first membrane bioreactors are arranged in one of a serial and parallel configurations and disposed upstream of said aerobic bioreactor subsystem.

11. The system of claim 8, wherein said aerobic bioreactor subsystem comprises a plurality of said second membrane bioreactors.

12. The system of claim 11, wherein said second membrane bioreactors are arranged in one of a serial and parallel configurations and disposed downstream of said anaerobic bioreactor subsystem.

13. The system of claim 8, wherein said anaerobic bioreactor subsystem further comprises a first anaerobic bioreactor and a last anaerobic bioreactor, said aerobic bioreactor subsystem comprises a first aerobic bioreactor and a last aerobic bioreactor, with said recycle loop being intermediate said first anaerobic bioreactor and last aerobic bioreactor and with said inorganic carbon source being intermediate said last anaerobic bioreactor and first aerobic bioreactor.

14. A method of bioprocessing, comprising the steps of:
anaerobically processing a feed in an anaerobic bioreactor subsystem which is substantially incapable of aerobically processing said feed, the step of anaerobically processing including a step of substantial total organic carbon degradation of more than 50% and up to about 90% in said feed and a step of substantial denitrification in said feed;
aerobically processing said feed in an aerobic bioreactor subsystem which is in direct feed communication with said anaerobic bioreactor subsystem, said aerobic bioreactor subsystem being substantially incapable of anaerobically processing said feed such that the anaerobic processing in said aerobic bioreactor is less than 50% and down to about 10%, said aerobic processing providing a step of nitrification in said feed; and
recycling said feed in a recycle loop from a portion of an effluent of said aerobic bioreactor subsystem and directly to an influent of said anaerobic bioreactor subsystem, said portion of effluent being in amount sufficient to provide for continuous, self-regulating pH in said anaerobic bioreactor subsystem.

15. The method of claim 14, wherein the step of aerobically processing follows the step of anaerobically processing in the substantial absence of an intervening step of further bioprocessing of said feed.

16. The method of claim 14, further comprising the step of providing said feed to said anaerobic bioreactor subsystem from a feed source upstream of said anaerobic bioreactor subsystem.

17. The method of claim 14, further comprising the step of providing an inorganic carbon source upstream of said aerobic bioreactor subsystem.

18. A method of bioprocessing wastewater, comprising the steps of:
providing a wastewater source;
anaerobically processing said wastewater in an anaerobic fixed film membrane bioreactor subsystem that is in communication with said wastewater source, said anaerobic bioreactor subsystem being substantially incapable of aerobically processing said wastewater, the step of anaerobically processing comprising a step of total organic carbon degradation of more than 50% and up to about 90% in said wastewater and a step of substantial denitrification of said wastewater;
aerobically processing said wastewater in an aerobic fixed film membrane bioreactor subsystem which is directly downstream of said anaerobic bioreactor subsystem, said aerobic bioreactor subsystem being substantially incapable of anaerobically processing said wastewater, the step of aerobically processing comprising a step of insubstantial total organic carbon degradation of less than 50% and down to about 10% in said wastewater and a step of substantial nitrification of said wastewater; and
recycling said wastewater in a recycle loop a portion of an effluent of said aerobic bioreactor subsystem and directly to an influent of said anaerobic bioreactor subsystem, said portion of effluent being in amount sufficient to provide for continuous, self-regulating pH in said anaerobic bioreactor subsystem.

19. The method of claim 18, further comprising the step of providing an inorganic carbon source in communication with an influent of said aerobic bioreactor subsystem.

20. The method of claim 18, wherein the step of anaerobically processing further comprises the step of passing said wastewater through one of a plurality of serially operable or parallely operable anaerobic bioreactors.

21. The method of claim 18, wherein the step of aerobically processing further comprises the step of passing said wastewater through one of a plurality of serially operable or parallely operable aerobic bioreactors.

* * * * *